United States Patent
Anderson et al.

(10) Patent No.: US 10,056,707 B2
(45) Date of Patent: Aug. 21, 2018

(54) ELECTRICAL CONTACT INCLUDING CORROSION-RESISTANT COATING

(71) Applicant: FCI USA LLC, Etters, PA (US)

(72) Inventors: Doyle R. Anderson, Etters, PA (US); John D. Dodds, Etters, PA (US); Antoine Fares-Karam, Besancon (FR)

(73) Assignee: FCI USA LLC, Etters, PA (US)

( * ) Notice: Subject to any disclaimer, the term of this patent is extended or adjusted under 35 U.S.C. 154(b) by 0 days.

(21) Appl. No.: 15/423,528

(22) Filed: Feb. 2, 2017

(65) Prior Publication Data
US 2017/0149157 A1  May 25, 2017

Related U.S. Application Data

(62) Division of application No. 14/433,393, filed as application No. PCT/US2013/063035 on Oct. 2, 2013, now Pat. No. 9,627,790.

(60) Provisional application No. 61/709,383, filed on Oct. 4, 2012.

(51) Int. Cl.
| | |
|---|---|
| *H01R 13/03* | (2006.01) |
| *G09B 19/00* | (2006.01) |
| *H01B 13/00* | (2006.01) |
| *H01B 1/02* | (2006.01) |
| *H01R 12/58* | (2011.01) |
| *H01R 13/115* | (2006.01) |

(52) U.S. Cl.
CPC .......... *H01R 13/03* (2013.01); *G09B 19/003* (2013.01); *H01B 1/02* (2013.01); *H01B 13/00* (2013.01); *H01B 13/0026* (2013.01); *H01R 12/58* (2013.01); *H01R 13/115* (2013.01)

(58) Field of Classification Search
CPC ...................................................... H01R 13/03
See application file for complete search history.

(56) References Cited

U.S. PATENT DOCUMENTS

| | | | | |
|---|---|---|---|---|
| 2,897,584 | A | * | 8/1959 | Schumpelt ............ B32B 15/018 428/670 |
| 6,136,160 | A | | 10/2000 | Hrkut et al. |
| 6,136,460 | A | | 10/2000 | Chen et al. |
| 6,143,700 | A | * | 11/2000 | Kato .................... C10M 105/18 508/268 |

(Continued)

OTHER PUBLICATIONS

Hardnesses of the elements (data page)—Wikipedia, https://en.wikipedia.org/wiki/Hardnesses_of_the_elements_(data_page), retrieved Jun. 14, 2017.*

(Continued)

*Primary Examiner* — Ross Gushi
(74) *Attorney, Agent, or Firm* — Wolf, Greenfield & Sacks, P.C.

(57) ABSTRACT

In accordance with one embodiment, an electrical contact has a mating end and a mounting end. The electrical contact includes an electrically conductive base, and a multi-layered coating disposed on an outer surface of the base at the mating end. The multi-layered coating can include a metallic layer of a noble metal or alloy thereat: a layer of anti-tarnish material disposed on the metallic layer, and a lubricant layer disposed on the layer of anti-tarnish material, the lubricant effective to seal at least some wear regions created in the layer of anti-tarnish material due to micromotion of the mating end in use.

22 Claims, 3 Drawing Sheets

(56) References Cited

U.S. PATENT DOCUMENTS

| | | | |
|---|---|---|---|
| 6,319,075 B1 | 11/2001 | Clark et al. | |
| 6,627,329 B1 * | 9/2003 | Shintani | B32B 15/018 |
| | | | 428/333 |
| 6,755,958 B2 | 6/2004 | Datta | |
| 7,331,800 B2 | 2/2008 | Winings et al. | |
| 8,187,017 B2 | 5/2012 | Dailey et al. | |
| 8,637,165 B2 * | 1/2014 | Siahaan | H01R 13/03 |
| | | | 200/269 |
| 2002/0077004 A1 | 6/2002 | Lawrence | |
| 2003/0207149 A1 | 11/2003 | Kobayashi et al. | |
| 2005/0196634 A1 | 9/2005 | Abe et al. | |
| 2009/0170381 A1 | 7/2009 | Sommovigo et al. | |
| 2009/0186502 A1 | 7/2009 | Chen et al. | |
| 2010/0230802 A1 | 9/2010 | Benjavasukul et al. | |
| 2011/0162707 A1 * | 7/2011 | Schuisky | C23C 14/08 |
| | | | 136/256 |
| 2012/0058692 A1 | 3/2012 | Huang et al. | |
| 2015/0280340 A1 | 10/2015 | Anderson et al. | |

OTHER PUBLICATIONS

U.S. Appl. No. 14/433,393, filed Apr. 3, 2015, Anderson et al.
EP 13843840.3, Apr. 5, 2016, Extended European Search Report.
PCT/US2013/063035, Jan. 22, 2014, International Search Report and Written Opinion.
PCT/US2103/063035, Apr. 16, 2015, International Preliminary Report on Patentability.
Extended European Search Report for European Application No. 13843840.3 dated Apr. 5, 2016.
International Search Report and Written Opinion for International Application No. PCT/US2013/063035 dated Jan. 22, 2014.
International Preliminary Report on Patentability for International Application No. PCT/US2013/063035 dated Apr. 16, 2015.

* cited by examiner

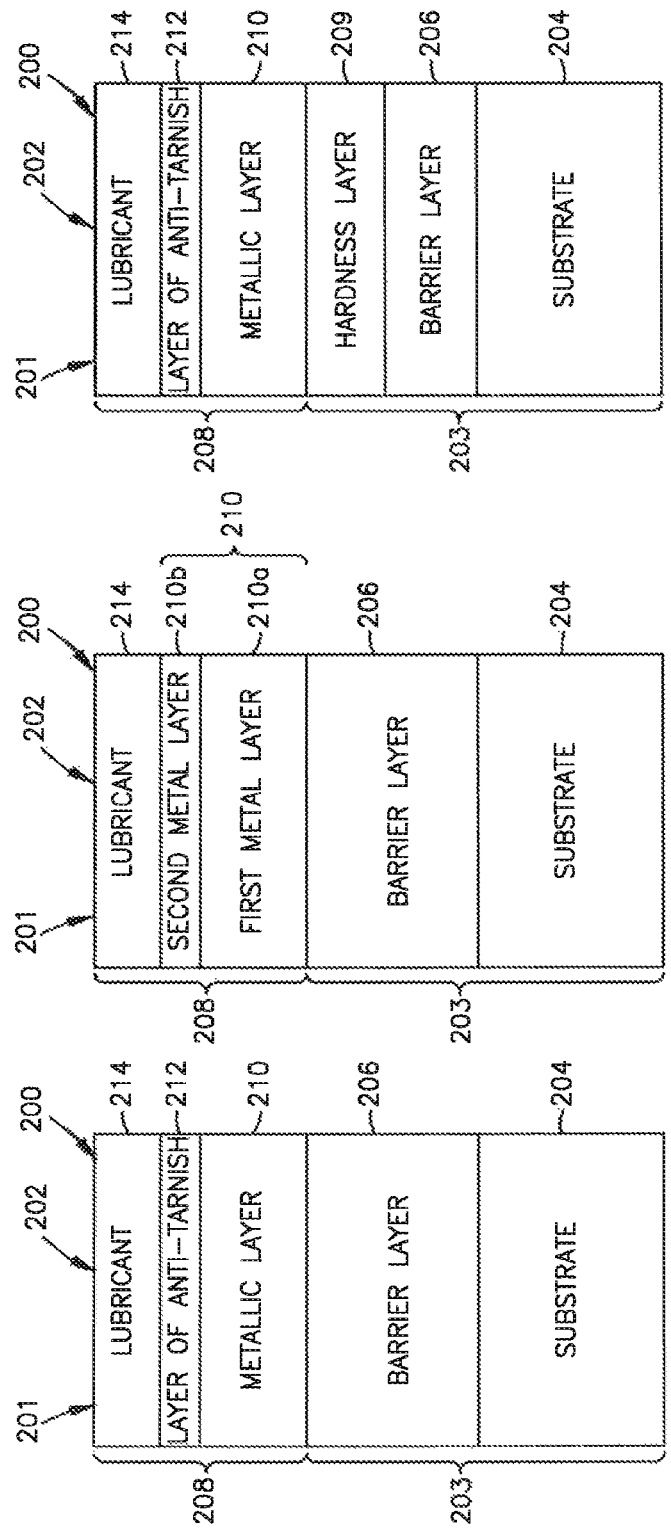

ELECTRICAL CONTACT INCLUDING CORROSION-RESISTANT COATING

RELATED APPLICATIONS

The present application is a divisional of U.S. patent application Ser. No. 14/433,393, filed Apr. 3, 2015, entitled "ELECTRICAL CONTACT INCLUDING CORROSION-RESISTANT COATING;" which is a U.S. National Stage application under 37 U.S.C. § 371 based on International Application No. the National Stage of International Application No. PCT/US2013/063035, filed Oct. 2, 2013, entitled "ELECTRICAL CONTACT INCLUDING CORROSION-RESISTANT COATING," which claims the benefit of U.S. Provisional Patent Application Ser. No. 61/709,383, filed Oct. 4, 2012, entitled "ELECTRICAL CONTACT INCLUDING CORROSION-RESISTANT COATING," the disclosures of which are incorporated herein by reference in their entireties, including any figures, tables, or drawings.

BACKGROUND

Electrical connectors used to transmit data signals and/or electrical power, such as alternating current (AC) power and/or direct current (DC) power between electrical components. For instance, an electrical connector can include a plurality of electrical contacts, including power and/or signal contacts, that mate with complementary electrical contacts of a complementary electrical connector. The electrical contacts typically define a mounting end that is configured to mount to an electrical component. such as a circuit board, cable, flex cable, or the like, and an opposed mating end that is configured to mate with the mating end of the complementary electrical contact.

Electrical connectors are typically configured such that as the electrical contacts mate along a wiping distance, the mating ends apply a normal force against each other that maintains the mated contacts in electrical connection with each other. During use, the mated electrical connectors are subject to thermal expansion particularly associated with electrical power contacts, and vibration, which can result in relative micromotion at the interface of the mating ends of the mated electrical contacts, which can cause localized fretting at the mating ends. Furthermore, some electrical connectors undergo a high number of mating cycles, whereby the electrical connectors are mated and unmated with other electrical connectors. The high number of mating cycles can cause the mating ends to become fretted due to abrasions at the mating ends caused by the high volume of mating and unmating with other electrical contacts.

While silver is a known conductor that is less expensive than gold for application at the mating end of electrical contacts, silver is significantly softer than gold and is thus subject to increased fretting and corrosion. Accordingly, it is known to apply a coating of anti-tarnish material onto the outer surface of the silver layer to reduce instances of corrosion to the silver.

SUMMARY

In accordance with one embodiment, an electrical contact has a mating end and a mounting end. The electrical contact includes an electrically conductive base, and a multi-layered coating disposed on an outer surface of the base at the mating end. The multi-layered coating can include a metallic layer of a noble metal or alloy thereof, a layer of anti-tarnish material disposed on the metallic layer, and disposed on the layer of anti-tarnish material, a layer of lubricant effective to seal at least some wear regions created on the anti-tarnish layer due to micromotion of the mating end in use.

BRIEF DESCRIPTION OF THE DRAWINGS

The foregoing summary, as well as the following detailed description of a preferred embodiment of the application, will be better understood when read in conjunction with the appended drawings. For the purposes of illustrating the multi-layered coating and related instruments of the present application, there is shown in the drawings example embodiments. It should be understood, however, that the application is not limited to the precise arrangements and instrumentalities shown. In the drawings:

FIG. 3A is a schematic side elevation view of a mating end of an electrical contact in accordance with one embodiment;

FIG. 3B is a schematic side elevation view of the mating end illustrated in FIG. 3A, but constructed in accordance with an alternative embodiment; and FIG. 4 is a schematic side elevation view of the mating end illustrated in FIG. 3A, but constructed in accordance with another alternative embodiment.

DETAILED DESCRIPTION

In accordance with one embodiment, a coating has been developed that can be applied to the mating end of an electrical contact. The coating contains a layer of lubricant that can be applied to a metallic layer or a layer of anti-tarnish material, which in turn is applied to a layer that includes at least one noble metal (the entirety of the layer can be made of the noble metal, an alloy of the noble metal, or combinations of noble metals or alloys thereof). For instance, the layer that includes the noble metal can be a layer of silver, gold, or a combination thereof. The anti-tarnish material is known to reduce instances of corrosion of the underlying layer of silver. However, the present disclosure recognizes that pitting can occur in the layer of anti-tarnish material, which can create regions of wear in the anti-tarnish material that exposes the underlying layer of noble metal to oxygen and risks corrosion of the layer of noble metal. It has been found that the layer of lubricant can self-seal at least some of the regions of wear, thereby improving corrosion resistance of the noble metal layer. In some embodiments. an electrically conductive layer, such as palladium-nickel alloy, having a hardness greater than that of the noble metal layer, can be disposed beneath the noble metal layer. In further alternative embodiments, the layer of lubricant can be applied directly onto the noble metal layer.

An electrical connector system can include first and second electrical connectors that are configured to be mated with each other, and mounted to respective complementary electrical components. For instance, one example of an electrical connector system can include a first electrical connector 22 (see FIG. 1A) and a second electrical connector 24 (see FIG. 2A). The first and second electrical connectors 22 and 24 can be configured to be mounted to complementary electrical components, such as printed circuit boards, and are further configured to mate with each other so as to place the respective complementary electrical components in electrical communication with each other. The first and second electrical connectors 22 and 24 can be constructed as described in U.S. Pat. No. 6,319,075, the disclosure of which is hereby incorporated by reference as if set forth in its entirety herein.

Figure 1A:
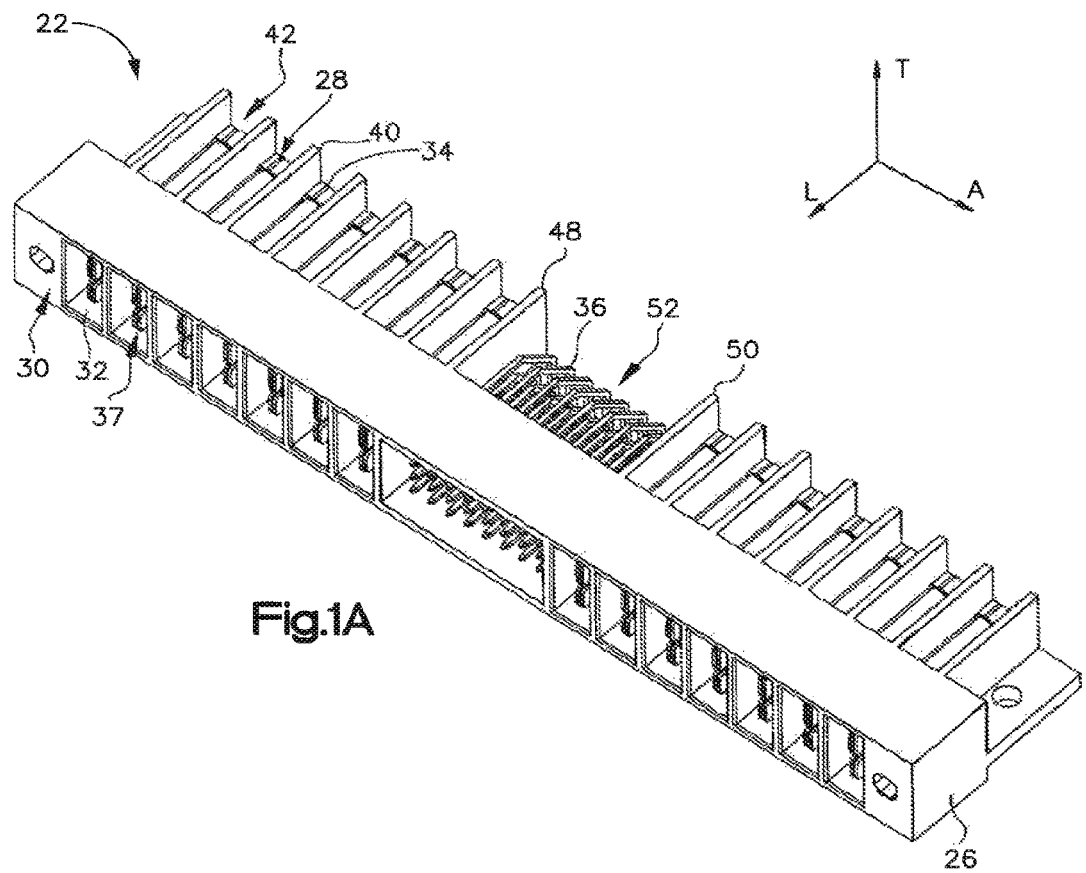
FIG. 1A is a perspective view of an electrical header connector constructed in accordance with one embodiment.
Figure 1B:
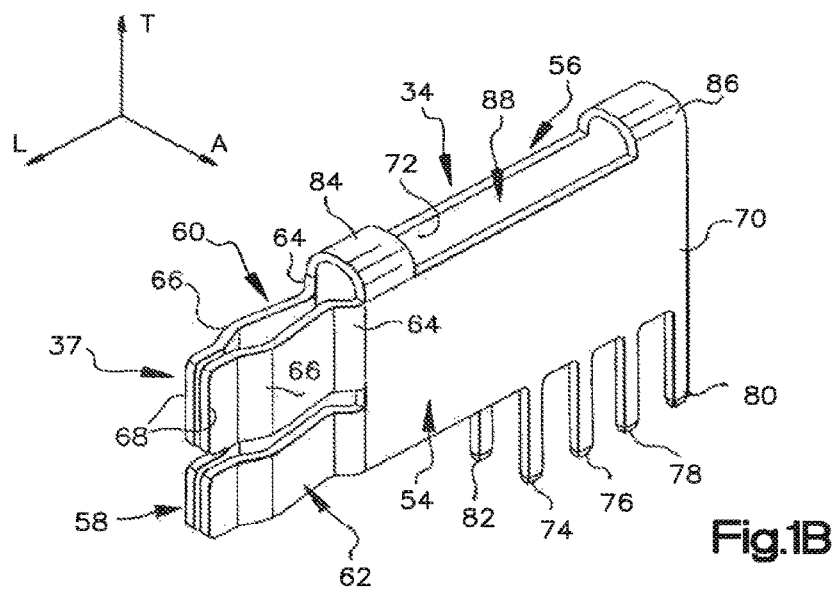
FIG. 1B is a perspective view of an electrical contact of the electrical header connector illustrated in FIG. 1A.

Referring now to FIGS. 1A-B, the first electrical connector 22 can define a header or plug connector that includes a dielectric or electrically insulative housing 26 and at least one electrical contact 28 such as a plurality of electrical contacts 28 supported by the housing 26. The electrical contacts 28 can be configured as header plug contacts, and include at least one electrical power header or plug contact 34 such as a plurality of electrical power plug contacts 34 and at least one electrical signal header or plug contact 36 such as a plurality of electrical signal plug contacts 36. The electrical power plug contacts 34 and the electrical signal plug contacts 36 can be configured as plug contacts that are configured to be received by complementary receptacle electrical contacts of the second electrical connector 24. The housing 26 includes a front end 30 having a plurality of power contact apertures 32 that are configured to receive select ones of the power contacts 34. The housing 26 also includes a number of rear vertical partitions, such as partitions 40, which form power contact retaining slots 42 for housing the power plug contacts 34. In accordance with the illustrated embodiment, the rear partitions 40 are spaced from each other along a lateral direction A, and the rear partitions 40 are spaced from the front end 30 along a longitudinal direction L that is substantially perpendicular to the lateral direction A. The housing 26 further defines opposed medial vertical partitions 48 and 50 spaced from each other along the lateral direction A, which form between them a rear signal pin array space 52 for housing rear portions of the signal plug contacts 36, which can be configured as signal pins.

The power plug contacts 34 can be configured as plug contacts having mating ends 37 that are configured to be received in complementary mating ends 111 of electrical power receptacle contacts 106 of the second electrical connector 24 when the first and second electrical connectors 22 and 24 are mated to each other. In accordance with the illustrated embodiment, the first electrical connector 22 is configured to be mated to the second electrical connector 24 along the longitudinal direction L, which can thus define a mating direction. Each power plug contact 34 in accordance with the illustrated embodiment has two opposed major side walls 54 and 56 spaced from each other along the lateral direction A. Each power plug contact 34 can define a front projection 58 that can define the mating end 37. The illustrated front projection 58 has an upper section 60 and a lower section 62 that is spaced from the upper section 60 along a transverse direction T that is substantially perpendicular to the lateral direction A and the longitudinal direction L In accordance with the illustrated embodiment, the transverse direction T is oriented vertically, and the longitudinal and lateral directions L and A are oriented horizontally, though it should be appreciated that the orientation of the electrical connector may vary during use.

Each of the upper and lower sections 60 and 62 includes a pair of opposed cantilever beams that can be spaced from each other along the lateral direction A. Each beam can have an inwardly converging proximal section 64, arcuate contact section 66, and a distal section 68 that is spaced from the proximal section 64 along the longitudinal direction L Thus, in accordance with the illustrated embodiment, the first electrical connector 22 is configured to mate with the second electrical connector 24 along the longitudinal direction L, which can define the mating direction from the proximal section 64 to the distal section 68. The opposed distal sections 68 can be substantially parallel to each other. The distal sections 68 can be positioned slightly apart when the beams are in relaxed condition but come together when the beams are deflected as the front projection is inserted into a receptacle contact (as explained below). This provides overstress protection for the beams during mating. The side walls 54 and 56 can also include first and second planar panels 70 and 72. Each power plug contact 34 can include one or more terminals 74, 76, 78, and 80 that extend from an edge of the panel 70. Each power plug contact 34 can include one or more terminals, such as terminal 82, that extends from the panel 72, along with a plurality of like terminals (not shown). Terminals 74-82 can comprise through hole, solder-to-board pins (as shown), press fit pins or surface mount tails. The panels 70 and 72 can be connected by upper arcuate bridging elements 84 and 86. A medial space 88, adapted for air flow, is defined between the panels 70 and 72. The terminals 74, 76, 78, 80, and 82 can extend below a bottom edge of the housing 76. The edge forms a mounting interface, along which the housing is mounted to a printed circuit board or other structure on which the connector is mounted. The power plug contacts 34 and the signal plug contacts 36 can be stamped or otherwise formed as a single piece from a substrate of any suitable contact materials such as phosphor bronze alloys or beryllium copper alloys.

While the first electrical connector 22 includes electrical power contacts 34 and electrical signal contacts 36, it should be appreciated that the first electrical connector 22 can alternatively include the electrical power contacts 34 without electrical signal contacts, or can include the electrical signal contacts 36 without electrical power contacts. Furthermore, while the connector housing 26, the electrical power contacts 34, and the electrical signal contacts 36 have been described in accordance with one embodiment, it should be appreciated that the connector housing, the electrical power contacts 34, and the electrical signal contacts 36 can be constructed in accordance with any alternative embodiment as desired. For instance, while the electrical contacts 28 are illustrated as right-angle electrical contacts having mounting ends that are oriented substantially perpendicular to the mating ends 37, the electrical contacts 28, including the electrical power contacts 34 and the electrical signal contacts 36, can alternatively be configured as vertical contacts whereby the mounting ends are oriented substantially parallel to the mating ends. Furthermore, the electrical power contacts 34 and the electrical signal contacts 36 can alternatively be configured as receptacle contacts or gender-neutral contacts as desired. One example of an alternatively constructed power connector is described in U.S. Pat. No. 8,187,017, the disclosure of which is hereby incorporated by reference as if set forth in its entirety herein. One example of an alternatively constructed signal connector is described in U.S. Pat. No. 7,331,800, the disclosure of which is hereby incorporated by reference as set forth in its entirety herein.

Figure 2A:
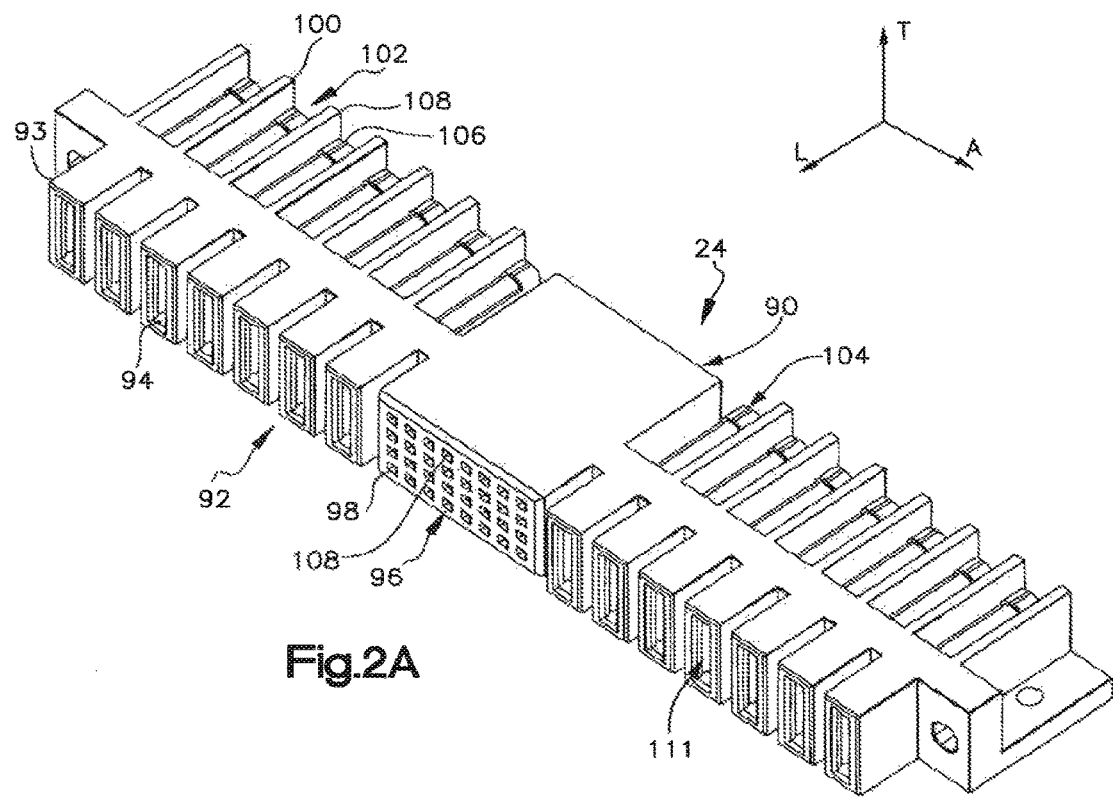
FIG. 2A is a perspective view of an electrical receptacle connector constructed in accordance with one embodiment.
Figure 2B:
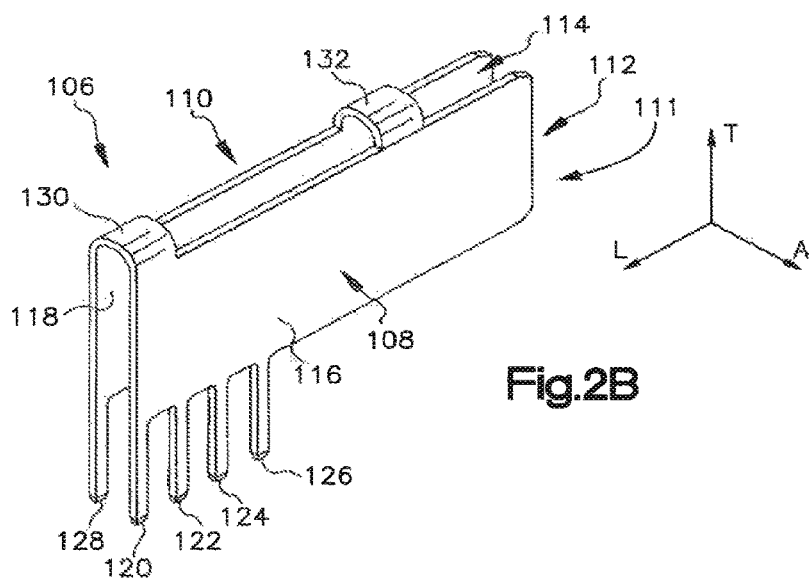
FIG. 2B is a perspective view of an electrical contact of the electrical receptacle connector illustrated in FIG. 2A.

Referring now to FIGS. 2A-B, the second electrical connector 24 can be configured as a receptacle connector whose electrical contacts are configured to receive the electrical contacts 28 of the first electrical connector 22. The second electrical connector 24 can include a dielectric or electrically insulative connector housing 90 with a front end 92 including a plurality of silos 93 having contact openings, such as openings 94. The front end 92 defines the mating end 111 and forms a mating interface of the second electrical connector 24 configured to mate with the first electrical connector 22. In particular, the mating end 37 of the first electrical connector 22 is configured to mate with the mating end 111 of the second electrical connector 24 so as to establish an electrical connection between the first and second electrical connectors 22 and 24. The silos 93 are configured and sized to be received in the openings 32 of the first electrical connector 22. The front end 92 includes a signal contact receiving area 96 that defines a plurality of signal pin receiving apertures 98 configured to receive the mating ends of the electrical signal contacts 36 of the first electrical connector so as to mate the electrical signal contacts 36 with the electrical signal contacts of the second electrical connector 24. The connector housing 90 also defines a plurality of rear partitions, such as partitions 100 which define contact retaining slots 102 between adjacent partitions 100. In accordance with the illustrated embodiment, the partitions 100 are spaced from each other along the lateral direction A, and the partitions 100 are spaced from the front end 92 along the longitudinal direction L that is substantially perpendicular to the lateral direction A.

The second electrical connector 24 further includes at least one electrical contact 104 such as a plurality of electrical contacts that are supported by the connector housing 90. The electrical contacts 104 can be configured as receptacle contacts, and include at least one electrical power receptacle contact 106 such as a plurality of electrical power receptacle contacts 106 and at least one electrical signal receptacle contact 108 such as a plurality of electrical signal receptacle contacts 108. The electrical power receptacle contacts 106 and the electrical signal receptacle contacts 36 can be configured as receptacle contacts that are configured to receive the complementary plug contacts 34 and 36, respectively, of the first electrical connector 22, when the first and second electrical connectors 22 and 24 are mated to each other along the mating direction. The contact retaining slots 102 are configured to house the power receptacle contacts 106. The signal contact receiving area 96 is configured to house the signal receptacle contacts 108 in alignment with the signal pin receiving apertures 98, such that the signal receptacle contacts 108 mate with the signal plug contacts 36 when the first and second electrical connectors 22 and 24 are mated to each other.

Each receptacle power contact 106 can have opposed, preferably planar and parallel, side walls 108 and 110 that extend forward in a front projecting portion 112, that forms a medial plug receiving space 114. In accordance with the illustrated embodiment, the side walls 108 and 110 are spaced from each other along the lateral direction A. The front portions 112 can be disposed within the silos 93 and openings 94 and sized and configured to receive the upper and lower sections 60 and 62 of the power plug contacts 34. The distance between the walls 108 and 110 at the front portion 112 can be such that the projection 58 of the power plug contact 34 is receivable in the plug contact receiving space 114, with the beams being resiliently deflected toward the center plane of the power plug contact 34. The deflection causes the beams to develop outwardly directed forces, thereby pressing the arcuate portions 66 against the inside surfaces of the portions 112 forming the receiving space 114, to develop a suitable contact normal force. Thus, the arcuate portions 66 can wipe along the inside surfaces of the portions 112. The side walls 108 and 110 can also include, respectively, panels 116 and 118. Extending from panel 116 there is at least one terminal such as terminals 120, 122, 124, and 126. The receptacle contact terminals 120, 122, 124, and 126 can extend beneath the lower surface 137 of the connector housing 90 so as to define the mounting interface of the second connector 24. Extending from the panel 118 there is at least one terminal 128 as well as several other terminals" The terminals 120-128 can be constructed essentially the same as previously described terminals 74-82. The side walls 108 and 110 can be joined together by generally arcuate bridging elements 130 and 132. The power receptacle contacts 106 and the signal receptacle contacts 108 can also stamped or otherwise formed in a single piece from a substrate of any suitable contact material phosphor bronze alloy or beryllium copper alloy.

The power receptacle contacts 106 can be retained in the connector housing 90 by an interference fit in essentially the same manner as previously described with respect to power plug contacts 34. Retaining the contacts in this fashion allows substantial portions of the walls 54 and 56 of the plug contact and was 116 and 118 of the power receptacle contacts 106 to be spaced from surrounding parts of the respective housings 26 and 90. This leaves a substantial proportion of the surface area of both contacts (including the plug contacts), exposed to air, thereby enhancing heat dissipation capabilities, principally through convection. Such enhanced heat dissipation capabilities are desirable for power contacts.

While the second electrical connector 24 includes electrical power contacts 106 and electrical signal contacts 108, it should be appreciated that the second electrical connector 24 can alternatively include the electrical power contacts 106 without electrical signal contacts, or can include the electrical signal contacts 108 without electrical power contacts. Furthermore, while the connector housing 90, the electrical power contacts 106, and the electrical signal contacts 108 have been described in accordance with one embodiment, it should be appreciated that the connector housing 90, the electrical power contacts 106, and the electrical signal contacts 108 can be constructed in accordance with any alternative embodiment as desired. For instance, while the electrical contacts 104 are illustrated as right-angle electrical contacts having mounting ends that are oriented substantially perpendicular to the mating ends 111, the electrical contacts 104, including the electrical power contacts 106 and the electrical signal contacts 108, can alternatively be configured as vertical contacts whereby the mounting ends are oriented substantially parallel to the mating ends. Furthermore, the electrical power contacts 106 and the electrical signal contacts 108 can alternatively be configured as plug contacts or gender-neutral contacts as desired. One example of an alternatively constructed power connector is described in U.S. Pat. No. 8,187,017, the disclosure of which is hereby incorporated by reference as if set forth in its entirety herein. One example of an alternatively constructed signal connector is described in U.S. Pat. No. 7,331,800, the disclosure of which is hereby incorporated by reference as if set forth in its entirety herein.

Referring to FIGS. 3A-B, a mating end 200 is illustrated of any suitable electrical contact 202, including any electrical contact described herein or incorporated by reference. The electrical contact 202 represents at least one such as a plurality of electrical contacts of an electrical connector, including all electrical contacts of an electrical connector. For instance, the electrical contact 202 can be an electrical power contact or an electrical signal contact in the form of a header or plug contact, a receptacle contact, or a gender-neutral contact. The electrical contact 202 can be configured as a vertical contact or a right-angle contact. The electrical contact 202 can represent at least one such as a plurality of electrical power contacts of the electrical connector up to all of the electrical power contacts of the electrical connector. Alternatively or additionally, the electrical contact 202 can represent at least one such as a plurality of electrical signal contacts of the electrical connector up to all of the electrical signal contacts of the electrical connector. The electrical contact 202 can be carried directly by the connector housing as described above, or can be carried by a leadframe housing which, in turn, is carried by a connector housing as described in U.S. Pat. No. 7,331,800, the disclosure of which is hereby incorporated by reference as if set forth in its entirety herein.

It will be appreciated that at least the mating end 200 can define a multi-layered structure 201, whereby each layer defines an outer surface that is configured to face the mating interface defined by the mating end 200, and thus configured to face the complementary electrical contact to which the electrical contact 202 is mated, and an inner surface that is opposite the outer surface. Each layer can further define a thickness that extends from the inner surface to the outer surface. Referring to FIGS. 1B and 2B, in accordance with the illustrated embodiments, the thickness of each layer is defined as extending along the lateral direction A from the inner surface to the outer surface, though it will be understood that the thickness of the layers can be measured along other directions as desired, such as the transverse direction T.

With continuing reference to FIGS. 3A-B, an entirety of the electrical contact 202, including the mating end 200, along with the mounting end and the intermediate portion that extends between the mating end 200 and the mounting end, can include an electrically conductive base 203 that can include an electrically conductive substrate layer 204 that can be made from any suitable electrically conductive material, such as copper, a copper alloy or any suitable alternative electrically conductive material. The base 203, and thus the entirety of the electrical contact 202, including the mating end 200, along with the mounting end and the intermediate portion that extends between the mating end 200 and the mounting end, can farther include a barrier layer 206 disposed on the substrate layer 204. The barrier layer 206 can be made from any suitable electrically conductive that can facilitate electrical connection at the mounting end of the electrical contact 202. For instance, the barrier layer 206 can be made from Nickel or any suitable alternative material, such as tin, aluminum, silver, gold, lead, Pd, an alloy of Pd such as PdNi, NiP, $Cu_3Sn$, CU {; $Sn_5$, and Cu Be 2%.

Nickel can be preferred if the mounting end of the electrical contact is a press-fit tail that is configured to be press-fit into an electrically conductive via, for instance of a substrate. The layer of nickel can protect the substrate layer 204 as the mounting end is press-fit into the electrically conductive via. Tin can be preferred if the mounting end of the electrical contact is to be surface mounted, such as soldered, to an electrically conductive pad of the substrate, as tin is softer than nickel and is known to allow for more reliable soldering than nickel The barrier layer 206 can have any thickness as desired, such as from about 1 micrometer to about 3 micrometers. It should be appreciated that the thickness can also be greater than 3 micrometers if desired.

The mating end 200 of the electrical contact 202 can include a multi-layered coating 208 that is disposed on the base 203, for instance on the barrier layer 206. For instance, the coating 208 can include a metallic layer 210 that can be made from any suitable noble metal or an alloy of the noble metal, and electroplated onto the base 203, for instance onto the barrier layer 206. The entirety of the metallic layer 210 can be made from noble metal or an alloy of the noble metal. In accordance with one embodiment, the metallic layer 210 is made from silver. In accordance with another embodiment, the metallic layer 210 is made from gold. It will be understood that the metallic layer 210 can be made from gold, silver, or the like, or a combination thereof. In accordance with yet another embodiment, referring to FIG. 3B, the metallic layer 210 can include a first metallic layer 210a and a second metallic layer 210b that is disposed on an outer surface of the first metallic layer 210a. The second metallic layer 210b can have a hardness that is greater than the first metallic layer 210a. In accordance with one embodiment, the first metallic layer 210b is made from silver and the second metallic layer 210b is made from gold. Thus, the metallic layer 210 can be plated with gold. The second metallic layer 210b can define any suitable thickness as desired, for instance from about 0.2 millimeters to about 0.4 millimeters.

The metallic layer 210 can define any suitable thickness as desired, for instance from about 0.2 micrometers to about 5 micrometers. The coating 208 can further include a layer 212 of a suitable anti-tarnish material that is applied to, and thus disposed on, the outer surface of the metallic layer 210 that is adapted to resist corrosion due, for instance, to fretting of the metallic layer 210. The layer 212 of anti-tarnish material can, for instance, be sold under the trade name Tarniban, manufactured by Technic, Inc., having a headquarter in Cranston, R.I. For instance, Tarniban 60 and Tarniban KS II are examples of a treatment which is known to protect silver surfaces from oxidation/tarnishing without adversely affecting the conductive properties of silver. Tarniban 60 is further adapted to be subjected to high thermal exposure. The layer 212 of anti-tarnish material can have any suitable thickness as desired, for instance from about 0.005 micrometers to about 2 micrometers.

The present disclosure recognizes that micromotion that occurs between the mating end 200 and the complementary mating end of the complementary electrical contact to which the electrical contact 202 is mated can cause the complementary mating end to wear through the layer 212 of anti-tarnish material at various regions of wear over a period of micromotion cycles, which can thus expose the metallic layer 210 to ambient air at the regions of wear during use. As a result, the metallic layer 210 can oxidize even at the regions of wear, even though the layer 212 of anti-tarnish material has been applied to the outer surface of the metallic layer 210. Thus, while it is known that silver is a better conductor than gold, which comprises conventional contacts, it is also known that silver is softer than gold and subject to increased regions of wear than gold. While anti-tarnish materials have proven to be initially suitable for its intended purpose, the present disclosure recognizes that the anti-tarnish alone does not suitably protect the metallic layer 210 over time during operation.

Accordingly, the present disclosure recognizes that the multi-layered coating 208 can include a lubricant layer 214 that is applied to the outer surface of the layer 212 of ant-tarnish material. Alternatively, referring to FIG. 3B for instance, the lubricant layer 214 can be applied directly to the outer surface of the metallic layer 210, which can be at least partially, for: instance entirely, made from gold. Further, the lubricant layer 214 can be disposed on the outer surface of the second metallic layer 210b, which can be made from gold according to an example embodiment. In accordance with one embodiment, the lubricant layer 214 can be made from an olefin, such as an alpha olefin, and in particular PAO (poly alpha olefin). Examples of a PAO lubricants are commercially available under the trademark AJC Oil Chili™, commercially available from Duracool® Refrigerants, having a place of business in Mississauga Ontario, Canada, and polyalphaolefins commercially available from Soltex, having a place of business in Houston, Tex. Alternatively, the lubricant 214 can be made from a perfluorinated polyether (PFPE), such as fluorinated lubricants commercially available under the trademark Fomblin® lubricant grade YR1800 from Solvay Specialty Polymers, having a place of business in Alpharelta, Ga. The Fomblin® lubricant grade YR1800 further includes a pore plugging agent that is effective to occupy microscopic voids in the underlying one or more of the layer 212 of anti-tarnish and the metallic layer 210. In accordance with one embodiment, the lubricant layer 214 can include an anti-corrosive agent. For instance, the lubricant layer can include an anti-corrosive agent that is commercially available under the trade name ZC-026 from Zip-Chem® Products, having a place of business in Morgan Hill, Calif.

For instance, the lubricant can be carried in a solvent, such as a viscous hydrocarbon-based solvent, that is applied, for instance brushed, dipped, or sprayed onto, to the outer surface of the layer 212 of anti-tarnish material or the outer surface of the metallic layer 210. The solvent can be allowed to dry, such that the lubricant layer 214 remains on the outer surface of the layer 212 of anti-tarnish material or the outer surface of the metallic layer 210.

In one embodiment, the lubricant layer 214 is effective to seal at least some up to all of the regions of wear of the layer 212 caused by micromotion of the mating end 200 in use, and can thus provide a barrier between the outer surface of the metallic layer 210 and the ambient environment at the regions of wear for a greater number of cycles of micromotion during operation than conventional mating ends that do not include the lubricant layer. Because oxidation and sulfurization of the metallic layer 210 is correspondingly reduced, the layer 210 of silver or gold for instance can have a reduced thickness compared to the thickness of silver or gold layers, respectively, of conventional mating ends, while maintaining a suitable current density when the electrical contact 202 is an electrical power contact.

The mating end 200 constructed in accordance with the illustrated embodiments was tested in accordance with industry standard vibration tests as described in EIA-364-28, Standard TP-28E, entitled "Vibration Test Procedure for Electrical Connectors and Sockets," the disclosure of which is hereby incorporated by reference as if set forth in its entirety herein. For instance, a point contact was applied to the mating end by a complementary component to simulate the complementary mating end of the complementary electrical contact to which the electrical contact 202 is mated. The complementary component was applied against the mating end 200 at a desired normal force, and a micromotion of various frequencies and amplitudes were applied between the complementary component and the electrical contact 202 over a desired number of cycles so as to simulate vibration and thermal expansion of the mating end 200 and the complementary mating end during operation. •nle results illustrated that the mating end 200 is adapted to withstand a greater amount of micromotion than conventional mating ends.

For instance. fretting corrosion described in Condition III E1A-364-28 Standard referenced above were made under the conditions of 2N load (650 MPa of contact pressure) applied from the spherical complementary component against the plane, and relative oscillating movement was induced at a frequency of 20 Hz and an amplitude of 20 micrometers (10 micrometers in opposite directions of center) so as to simulate micromotion that occurs during use. The sphere had a radius of approximately 1.3 mm. Coefficient of friction tests were conducted under loads of 3N and 6N, whereby a spherical complementary component having a diameter of 6 mm. made from brass plated with 2.5 micrometers of nickel and 2 micrometers of silver) was biased against a plane constructed as described herein with respect to the mating end 200. The complementary component was applied against the mating end 200 at a desired normal force so as to produce loads of 3N and 6N, and relative oscillating movement was induced between the plane and the sphere at an amplitude of 10 mm (5 mm in opposite directions of center). The results illustrate that the mating end 200 is adapted to withstand a greater amount of micromotion than conventional mating ends without corroding.

Referring now to FIG. 4, it is recognized that when electrical connectors are mated and unmated, the mating end 200 wipes against a complementary mating end that is biased against the mating end 200 at a normal force, which can cause tracks to form in the multi-layered coating 208. Certain electrical connectors are incorporated into an electrical connector system whereby the connectors undergo a high number of mating cycles, whereby they are mated and unmated with complementary electrical connectors. The present disclosure recognized that micromotion associated with a high volume of wiping can tend to affect the integrity of the multi-layered coating 208. Conventional mating ends adapted to undergo high mating cycles include a layer of gold instead of silver. Even though gold is less conductive than silver and more expensive than silver, gold is harder than silver, and thus less susceptible to wear. The present disclosure recognizes that the high hardness layer 209 prevents wearing through to nickel, in the event that abrasions wear through the metallic layer 210.

Accordingly, the multi-layered coating can include a high hardness layer 209 disposed between the metallic layer 210 and the barrier layer 206. The high hardness layer 209 has a hardness greater than that of the metallic layer 210, and is adapted to provide a barrier between the complementary mating end and the base 203 (in particular the barrier layer). In accordance with the illustrated embodiment, the high hardness layer 209 can be made from palladium-nickel (Pd—Ni). Accordingly, in rare instances where a high number of mating cycles causes the complementary mating end to pierce the lubricant layer 214, the layer 212 of anti-tarnish, and the metallic layer 210, high hardness layer 209 prevents the complementary mating end from contacting the barrier layer 206, thereby increasing the durability of the mating end 200. It should be appreciated that the high hardness layer can further be included whether the micromotion is due to vibration, thermal expansion, or a high number of mating cycles.

Fretting corrosion tests and coefficient of friction tests were carried out on the mating end 200 having the high hardness layer as described above with respect to the mating end 200. The tests were performed in accordance with the EIA-364-28 Standard referenced above. In particular, the tests were performed as described in Condition III of Revision E of the EIA-364-28 Standard that is incorporated by reference above. The results of the tests demonstrate that the mating end 200 has higher performance than conventional non-lubricated silver, and also higher than conventional gold flash-PdNi. Without being bound by theory, it is believed that the high conductivity of silver and the high hardness of Pd—Ni allows the mating end 200 to achieve high performance even when the metallic layer 210 is only 0.5 micrometers thick when the high hardness layer 209 has a thickness of 038 micrometers.

Temperature rise as a function of current was measured in accordance with EIA-364-70B, entitled "Temperature Rise Versus Current Test Procedure for Electrical Connectors and Sockets," the disclosure of which is hereby incorporated by reference as if set forth in its entirety herein. The test was conducted for both 1) samples having the lubricant layer 214 as illustrated in FIGS. 3A-B, and 2) cleaned samples that were thus devoid of the lubricant layer 214, under conditions of high humidity. In particular, the samples were measured after a time of 96 hours at 40 degrees Celsius at 95% relative humidity. The results illustrate that the temperature rise at 30A was greater for samples that contained the lubricant layer 214 as illustrated in FIGS. 3A-B, compared to the cleaned samples that were devoid of the lubricant layer 214.

Temperature rise as a function of current was also measured for both 1) various samples having the lubricant layer 214 and 2) cleaned samples that were devoid of the lubricant layer 214, over a period of 200 mating cycles over 21 days at 105 degrees Celsius in high humidity. The results, illustrate that the temperature rise at 30A was 21.9 degrees Celsius for the samples that contained the lubricant layer 214, and 25.5 degrees Celsius for the cleaned samples.

It should be appreciated that a method can be provided for fabricating a mating end of an electrical contact having an electrically conductive base. The method can include the steps of applying a metallic layer of a noble metal onto an outer surface of the base, applying a layer of anti-tarnish material onto an outer surface of the metallic layer, and applying a lubricant onto an outer surface of the layer of anti-tarnish. The conductive base can comprise a layer of aluminum or aluminum alloy and an electrically conductive barrier layer disposed on an outer surface of the layer of aluminum or aluminum alloy, and the first applying step can comprise the step of applying the metallic layer onto the barrier layer. The method can further include the step of applying a solvent that carries the lubricant to the outer surface of the layer of anti-tarnish material The method can further include the step of drying the solvent so that the lubricant remains on the outer surface of the anti-tarnish material. The lubricant can be an PAO. The method can further include the step of applying a high hardness layer onto the outer surface of the base, wherein the first applying step comprises the step of applying the metallic. layer of the noble metal onto the high hardness layer.

A method can further be provided to improve wear properties of a mating end of an electrical contact having a mating end and a mounting end. The method can include the steps of providing or teaching use of the electrical contact having an electrically conductive base, and a metallic layer disposed on the electrically conductive base, teaching the step of applying a layer of anti-tarnish material onto the metallic layer, and teaching the step of applying a lubricant layer onto the layer of anti-tarnish material, such that the lubricant is effective to seal regions of wear in the anti-tarnish material due to micromotion between the mating end and a mating end of a complementary electrical contact to which the electrical contact is mated. The method can further include the step of identifying an electrical contact that is configured to experience wear due to a high number of mating cycles, and teaching the step of applying a high hardness layer onto the metallic layer, the high hardness layer having a hardness greater than that of the metallic layer, and teaching the step of applying the layer of anti-tarnish material onto the high hardness layer.

What is claimed:

1. An electrical contact having a mating end and a mounting end, the electrical contact comprising:
  an electrically conductive base; and
  a multi-layered coating disposed on an outer surface of the base at the mating end, the multi-layered coating including:
    a metallic layer comprising a silver layer and a gold layer disposed directly on the silver layer; and
    a layer of lubricant disposed directly on the gold layer, wherein the layer of lubricant is effective to seal at least some wear regions created on the metallic layer due to micromotion of the mating end in use, wherein the layer of lubricant comprises a perfluorinated compound.

2. The electrical contact of claim 1, wherein the gold layer is disposed on an outer surface of the silver layer.

3. The electrical contact of claim 2, wherein the layer of lubricant is disposed on an outer surface of the gold layer.

4. The electrical contact of claim 1, wherein the base comprises a substrate made from an electrically conductive material, and an electrically conductive barrier layer disposed between the substrate and the metallic layer.

5. The electrical contact of claim 4, wherein the barrier layer is made from any one of nickel, tin, aluminum, silver, gold, lead, palladium, and an alloy of palladium.

6. The electrical contact of claim 1, wherein the perfluorinated compound comprises perfluorinated polyether.

7. The electrical contact of claim 1, wherein the electrical contact is a power contact.

8. The electric contact of claim 7, wherein the power contact is configured to support currents of 0-25 A.

9. The electric contact of claim 8, wherein the power contact is configured to support currents of 0-50 A.

10. The electrical contact of claim 1, wherein the electrical contact withstands a greater amount of micromotion than conventional mating ends in accordance with industry standard vibration tests as described in EIA-364-28, Standard TP-28E, entitled "Vibration Test Procedure for Electrical Connectors and Sockets."

11. The electrical contact of claim 10, wherein the industry standards vibration tests are such that a contact pressure of 650 MPa is applied to the electrical contact with a relative oscillating movement having a frequency of 20 Hz.

12. A method of fabricating a mating end of an electrical contact having an electrically conductive base, the method comprising the steps of:
  applying a silver layer onto an outer surface of the base;
  applying a gold layer directly onto an outer surface of the silver layer; and
  applying a lubricant directly onto an outer surface of the gold layer, wherein the lubricant comprises a perfluorinated compound.

13. The method of claim 12, wherein the conductive base layer comprises a layer of aluminum or aluminum alloy and an electrically conductive barrier layer disposed on an outer surface of the layer of aluminum or aluminum alloy, and wherein applying the silver layer onto an outer surface of the base comprises applying the silver layer onto the barrier layer.

14. The method of claim 13, wherein the lubricant further comprises poly alpha olefin.

15. The method of claim 12, wherein the perfluorinated compound comprises perfluorinated polyether.

16. The method of claim 12, wherein applying the lubricant directly onto an outer surface of the gold layer comprises applying a solvent that carries the lubricant to the outer surface of the gold layer.

17. The method of claim 16, further comprising the step of drying the solvent so that the lubricant remains on the outer surface of the gold layer.

18. A method of operating an electrical contact having a mating end comprising a silver layer and a gold layer disposed directly on the silver layer, the method comprising:
  contacting the mating end of the electrical contact with a complementary electrical contact; and
  sealing a wear region arising on the mating end of the electric contact due to micromotion of the mating end with a layer of lubricant disposed directly on the gold layer, wherein the layer of lubricant comprises a perfluorinated compound.

19. The method of claim 18, further comprising:
applying the layer of lubricant directly on the gold layer prior to contacting the mating end of the electrical contact with the complementary electrical contact.

20. The method of claim 18, wherein the layer of lubricant comprises an anti-corrosive agent.

21. The method of claim 18, further comprising:
causing a current of at least 10 A to flow between the electrical contact and the complementary electrical contact.

22. The method of claim 18, wherein the perfluorinated compound comprises perfluorinated polyether.

* * * * *